(12) United States Patent
Sekiya

(10) Patent No.: US 6,659,098 B1
(45) Date of Patent: Dec. 9, 2003

(54) ROTARY TOOL INCLUDING A CUTTING BLADE AND CUTTING APPARATUS COMPRISING THE SAME

(75) Inventor: Keizo Sekiya, Tokyo (JP)

(73) Assignee: Disco Corporation, Tokyo (JP)

( * ) Notice: Subject to any disclaimer, the term of this patent is extended or adjusted under 35 U.S.C. 154(b) by 0 days.

(21) Appl. No.: 09/706,834

(22) Filed: Nov. 7, 2000

(30) Foreign Application Priority Data

Nov. 10, 1999 (JP) .......................................... 11-319781

(51) Int. Cl.[7] .................................................. B28D 1/04
(52) U.S. Cl. ........................ 125/13.01; 451/8; 125/23.01
(58) Field of Search ............................ 451/5, 8–11, 41, 451/178; 125/13.01, 12, 23.01

(56) References Cited

U.S. PATENT DOCUMENTS

| | | | | |
|---|---|---|---|---|
| 5,819,931 A | * | 10/1998 | Boucher et al. | 206/349 |
| 5,842,325 A | * | 12/1998 | Godly et al. | 53/411 |
| 5,842,461 A | * | 12/1998 | Azuma | 125/13.01 |
| 5,993,292 A | * | 11/1999 | Oishi et al. | 451/41 |
| 6,029,815 A | * | 2/2000 | Ali | 206/349 |
| 6,159,072 A | * | 12/2000 | Shibata | 451/6 |
| 6,250,990 B1 | * | 6/2001 | Yoshii et al. | 451/5 |
| 6,280,308 B1 | * | 8/2001 | Ishikawa et al. | 451/289 |
| 6,290,569 B1 | * | 9/2001 | Mizuno et al. | 451/5 |
| 6,330,488 B1 | * | 12/2001 | Yoshida et al. | 700/177 |

* cited by examiner

*Primary Examiner*—Lee D. Wilson
*Assistant Examiner*—Hadi Shakeri
(74) *Attorney, Agent, or Firm*—Smith, Gambrell & Russell, LLP

(57) ABSTRACT

A cutting apparatus comprising a rotary shaft which is detachably fitted with a rotary tool including a cutting blade. The rotary tool itself or a storage case storing the rotary tool has an indicator which may be a bar code and shows the characteristic properties of the cutting blade. A reading means such as a bar code reader for reading the above indicator showing the characteristic properties of the cutting blade is installed on the cutting apparatus.

13 Claims, 4 Drawing Sheets

ROTARY TOOL INCLUDING A CUTTING BLADE AND CUTTING APPARATUS COMPRISING THE SAME

FIELD OF THE INVENTION

The present invention relates to a rotary tool including a cutting blade and to a cutting apparatus comprising the same. More specifically, it relates to a rotary tool which needs to recognize the characteristic properties of the cutting blade of the rotary tool at the time of cutting; and to a cutting apparatus comprising the same.

DESCRIPTION OF THE PRIOR ART

A typical example of cutting apparatus comprising a rotary tool including a cutting blade is a dicer for cutting a semiconductor wafer along cutting lines arranged in a lattice pattern on the surface of the semiconductor wafer. In this dicer, a rotary tool having a thin (for example, about 15 μm) ring plate-like cutting blade is fitted onto a rotary shaft which is rotated at a high speed. The cutting blade of the rotary tool which is rotated at a high speed is caused to work on the semiconductor wafer to cut it. In order to cut the semiconductor wafer with desired sufficiently high accuracy, it is important to position the cutting blade and the semiconductor wafer relative to each other with sufficiently high accuracy. Stated in more detail, it is important to align the center line in a thickness direction of the cutting blade with the center line of each of the cutting lines on the surface of the semiconductor wafer with sufficiently high accuracy. It is also necessary to set the interference depth (cutting depth) of the cutting blade in the semiconductor wafer to a fully accurate predetermined value. In order to carry out the relative positioning of the cutting blade and the semiconductor wafer with sufficiently high accuracy, it is necessary to recognize the characteristic properties such as thickness and outer diameter of the cutting blade with sufficiently high accuracy. The cutting blade of the rotary tool for dicing the semiconductor wafer is generally formed as an electrodeposition layer comprising abrasive diamond grains held by an electrodeposition metal. As is known among people skilled in the art, the existence of some error in the formation of the above electrodeposition layer cannot be avoided and some error inevitably exists in the characteristic properties such as thickness and outer diameter of the cutting blade. To cope with this, when a new rotary tool is set in the cutting apparatus, a semiconductor wafer is tentatively cut by the rotary tool and the cut state of the semiconductor is analyzed in detail to recognize the characteristic properties of the cutting blade based on the analytical results. Based on this information, the positioning of the cutting blade relative to the semiconductor wafer is controlled when the semiconductor wafer is to be actually diced.

Thus, the detailed analysis of the cut state of the semiconductor wafer by tentatively cutting the semiconductor wafer each time a new rotary tool is used is extremely troublesome and requires great skill.

SUMMARY OF THE INVENTION

It is a principal object of the present invention to make it possible to recognize the characteristic properties of a cutting blade in a rotary tool quickly and easily without the need for tentatively cutting a semiconductor wafer.

According to an aspect of the preset invention, there is provided a rotary tool including a cutting blade and an indicator showing the characteristic properties of the cutting blade. There is also provided a cutting apparatus on which the rotary tool is detachably mounted and which comprises a means of reading the indicator.

Preferably, the rotary tool includes a hub integrated with the cutting blade and the indicator is provided on the surface of the hub. The cutting blade is shaped like a thin annular plate which extends from the hub and the characteristic properties include at least one of the thickness of the cutting blade, the outer diameter of the cutting blade and the projecting length in a radial direction of the cutting blade from the periphery of the hub.

According to another aspect of the present invention, there is also provided a combination of a rotary tool including a cutting blade and a storage case for storing the rotary tool, wherein the storage case includes an indicator showing the characteristic properties of the cutting blade. There is also provided a cutting apparatus on which the rotary tool of the combination is detachably mounted and which comprises a means of reading the indicator.

Preferably, the rotary tool is composed of a thin ring plate-like cutting blade alone. The characteristic properties include at least one of the thickness of the cutting blade, the outer diameter of the cutting blade and the inner diameter of the cutting blade.

The indicator is preferably a bar code. The bar code is preferably printed on a tag affixed to the rotary tool. The cutting blade is composed of an electrode position layer containing abrasive diamond grains and preferably shaped like a thin ring plate. The reading means may be a bar code reader.

DETAILED DESCRIPTION OF THE PREFERRED EMBODIMENTS

Preferred embodiments of the present invention will be described in detail with reference to the accompanying drawings.

Figure 1:
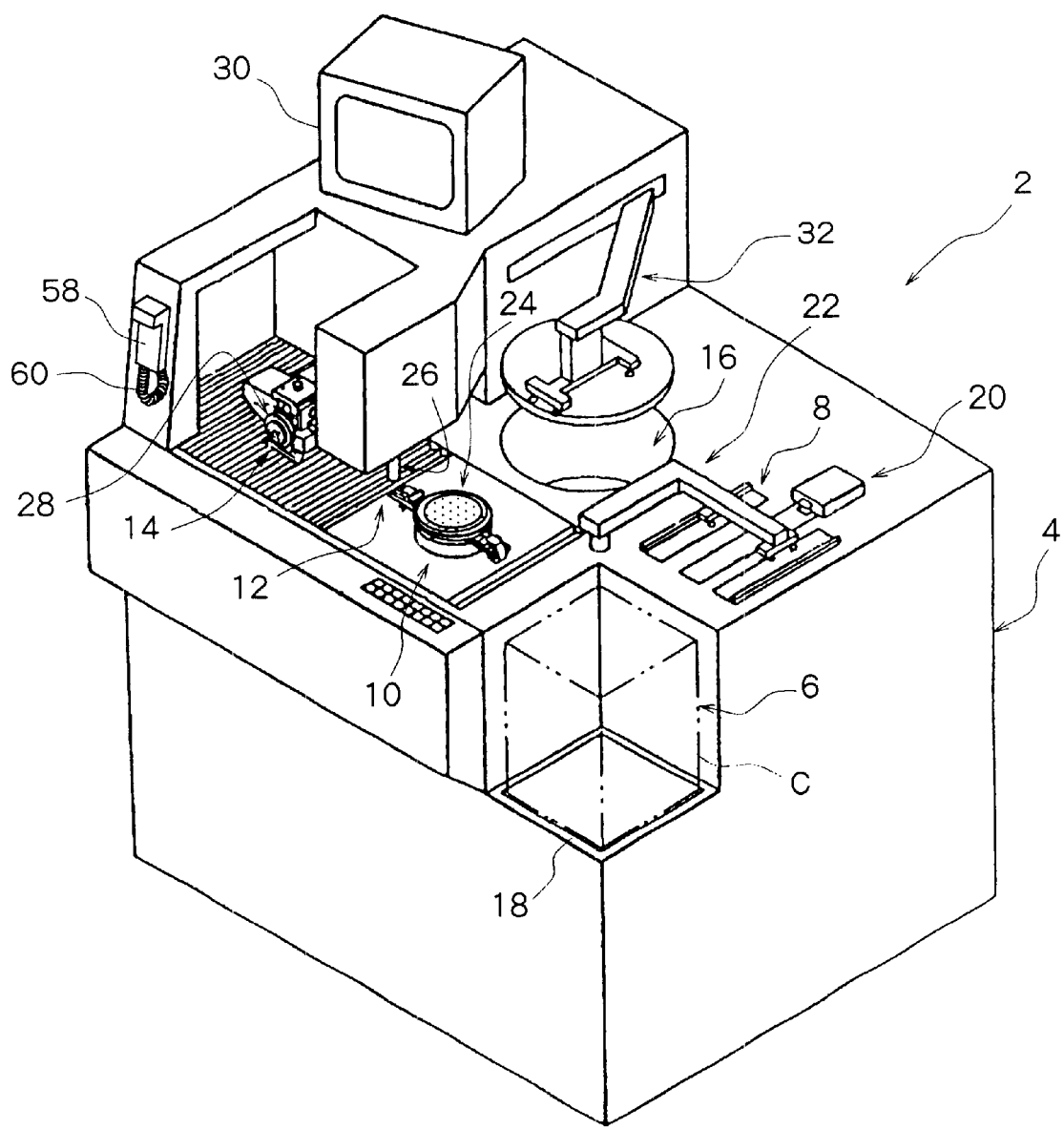
FIG. 1 is a perspective view schematically showing a dicer according to the present invention.
Figure 2:
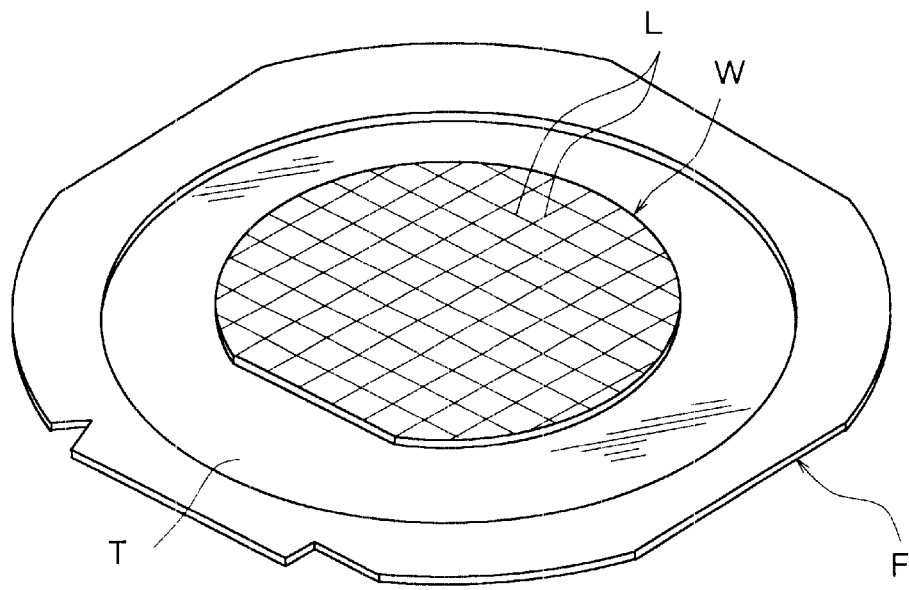
FIG. 2 is a perspective view showing a semiconductor wafer to be diced by the dicer of FIG. 1.

FIG. 1 shows a semiconductor wafer dicer which is an example of the cutting apparatus. The dicer entirely denoted by numeral 2 comprises a housing 4. On the housing 4, a loading area 6, a waiting area 8, a chucking area 10, an alignment area 12, a cutting area 14 and a final cleaning and drying area 16 are defined. A hoisting and lowering table 18 is disposed in the loading area 6, and a cassette C storing a plurality of semiconductor wafers W (FIG. 2) which are spaced apart from one another in a vertical direction is placed on this hoisting and lowering table 18. As clearly shown in FIG. 2, each of the semiconductor wafers W stored in the cassette C is set in a central opening in a frame F through a mounting tape T. The mounting tape T which can be formed from an appropriate synthetic resin film is laid across the central opening in the frame F and bonded to the rear side of the semiconductor wafer W and to the rear side of the frame F. Cutting lines L are arranged in a lattice pattern on the surface of the semiconductor wafer W. A first transport means 20 is provided in conjunction with the loading area 6 and the waiting area 8. The first transport means 20 is moved in response to the vertical movement of the hoisting and lowering table 18 to deliver the frame F on which the semiconductor wafer W to be cut is mounted to the waiting area 8 from the cassette C (to supply the frame F, on which the cut, finally cleaned and dried semiconductor wafer W is mounted, into the cassette C from the waiting area 8 as will be described hereinafter). A second transport means 22 is provided in conjunction with the waiting area 8, the chucking area 10 and the final cleaning and drying area 16. The frame F delivered from the cassette C to the waiting area 8 is carried to the chucking area 10 by the second transport means 22. In the chucking area 10, the frame F on which the semiconductor wafer W to be cut is mounted is vacuum attracted onto the top of a chuck 24 having a circular surface. The frame F attracted onto the top of the chuck 24 in the chucking area 10 is moved in accordance with the movement of the chuck 24 and positioned in the alignment area 12. An imaging means 26 is provided in conjunction with the alignment area 12 to pick up an image of the surface of the semiconductor wafer W mounted on the frame F. Based on the image, the chuck 24 (accordingly, the frame F having the semiconductor wafer W mounted thereon) is precisely positioned so that the cutting lines L arranged on the surface of the semiconductor wafer W are located at the required relative positions with respect to a cutting means 28 (which will be detailed hereinafter) provided in conjunction with the cutting means 14. The surface of the semiconductor wafer W whose image is picked up by the imaging means 26 is displayed on a monitor 30. Thereafter, the chuck 24 is moved to the cutting area 14 where the semiconductor wafer W mounted on the frame F is cut along the cutting lines L in the cutting area 14. This cutting is generally carried out by cutting the semiconductor wafer W completely without cutting the mounting tape T substantially. Therefore, even after the semiconductor wafer W is cut, the semiconductor wafer W continues to be mounted on the frame F through the mounting tape T.

After the semiconductor wafer W is cut as desired in the cutting area 14, the frame F is returned to the chucking area 10 by the movement of the chuck 24. A third transport means 32 is provided in conjunction with the chucking area 10 and the final cleaning and drying area 16 to carry the frame F to the final cleaning and drying area 16. In the final cleaning and drying area 16, the cut semiconductor wafer W is finally cleaned and dried by a cleaning and drying means (not shown). Thereafter, the frame F is returned to the waiting area 8 by the above second transport means 22 and then to the cassette C by the first transport means 20.

The above-described constitution of the illustrated dicer 2 is already known to a person skilled in the art and does not form part of new feature of the present invention. Therefore, the detailed description of the dicer 2 is omitted in this specification.

Figure 3:
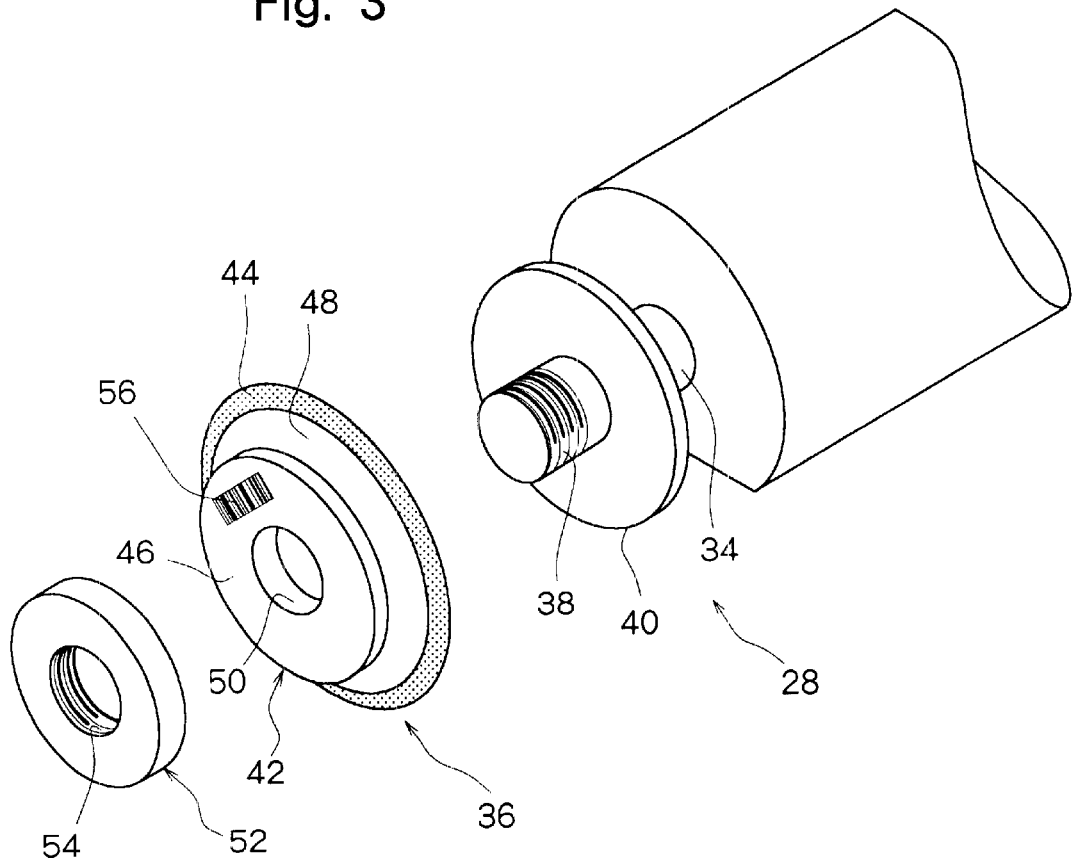
FIG. 3 is an exploded perspective view showing a cutting means of the dicer of FIG. 1.

Explaining with reference to FIG. 1 and FIG. 3, the cutting means 28 arranged in the above cutting area 14 comprises a rotary shaft 34 extending substantially in a horizontal direction and a rotary tool 36 is detachably attached to a free end portion of the rotary shaft 34. In the illustrated embodiment, an end portion 38 of the rotary shaft 34 is threaded and an annular flange 40 is formed at the rear of the threaded end portion 38. Continuing to explain with reference to FIG. 3 and FIG. 4, the rotary tool 36 is composed of a hub 42 and a cutting blade 44. The hub 42 which can be formed from an appropriate metal such as aluminum has a relatively thick circular center portion 46 and an annular flange portion extending from this center portion 46. A circular through-hole 50 is formed in the center portion 46 of the hub 42. The inner diameter of the through-hole 50 is substantially the same as the outer diameter of the above rotary shaft 34. The thickness of the flange portion 48 is gradually reduced toward its periphery. The cutting blade 44 is fixed to one side, that is, right side in FIG. 4, of the flange portion 48 of the hub 42. This cutting blade 44 is preferably composed of an electrodeposition layer containing abrasive diamond grains.

Figure 4:
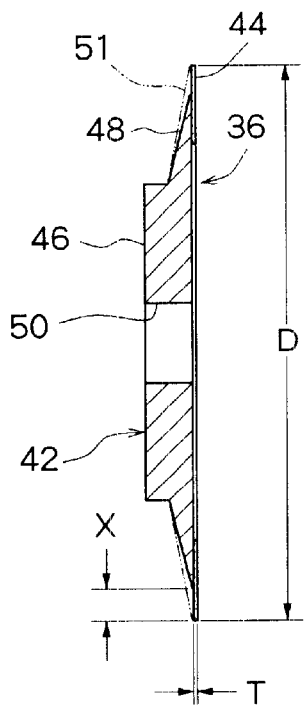
FIG. 4 is a sectional view showing a rotary tool in the cutting means of FIG. 3.

As described above, the rotary tool 36 can be formed nicely by an electrodeposition method known per se. Briefing an example of method of forming the rotary tool 36, a hub raw material the projecting length of an annular flange portion of which is larger than the annular flange portion 48 of the hub 42 by a predetermined length as shown by a two-dot chain line in FIG. 4 and a metal piece which may be a nickel piece are immersed in an electrolyte which may be a nickel sulfate solution and a predetermined voltage is applied between the hub raw material and the metal piece. The hub raw material is covered with an insulating material excluding a surface area where an electrodeposition layer should be formed. A large amount of abrasive diamond grains are contained in the electrolyte. Then, the abrasive diamond grains contained in the electrolyte are accumulated and the metal is electrodeposited on the non-insulated area of the hub raw material, whereby an electrodeposition layer containing the abrasive diamond grains is formed. Thereafter, an area other than a portion 51 shown by a two-dot chain line in FIG. 4 of the hub raw material is covered with a non-soluble material, and a hub member having the electrodeposition layer formed thereon is immersed in a solution which may be a sodium hydroxide solution, whereby the portion 51 shown by the two-dot chain line in FIG. 4 is dissolved to form the rotary tool 36 consisting of the hub 42 and the cutting blade 44 which are integrated with each other. The cutting blade 44 of the rotary tool 36 has a thickness T of about 15 $\mu$m, for example, and an outer diameter D of about 50 mm, for example, and the projecting length X in a radial direction of the cutting blade 44 from the periphery of the hub 42 may be about 2 mm, for example.

Continuing explanation with reference to FIG. 3, the rotary tool 36 is fitted onto the rotary shaft 34. More specifically, the rotary shaft 34 is inserted into the through-hole 50 of the rotary tool 36 and then a fastening member 52 is mated with the threaded end portion 38 of the rotary shaft 34 so that the rotary tool 36 is held between the annular flange 40 formed on the rotary shaft 34 and the fastening member 52. Thus, the rotary tool 36 is fitted onto the rotary shaft 34. The fastening member 52 is shaped like a short cylinder and its inner surface 54 is threaded so that it is mated with the threaded portion 38 of the rotary shaft 34.

As is known among persons skilled in the art, it is substantially extremely difficult to form with sufficiently high accuracy the cutting blade 44 which is composed of an electrodeposition layer containing abrasive diamond grains though not impossible and slight changes in the thickness T, outer diameter D and projecting length X of the cutting blade 44 exist inevitably. Changes in the thickness of the cutting blade 44 affect alignment between the center line in a thickness direction of the cutting blade 44 and the center line of the cutting line L on the surface of the semiconductor wafer W and changes in the outer diameter D of the cutting blade 44 affects the cutting depth of the semiconductor wafer W. When the semiconductor wafer w is cut by the cutting blade 44, the cutting blade 44 is thereby gradually worn out, whereby the projecting length X of the cutting blade 44 affects the service life of the rotary tool 36. Therefore, when a new rotary tool 36 is to be attached to the rotary shaft 34, it is necessary to clearly recognize the characteristic properties, that is, thickness T, outer diameter D and projecting length X of the cutting blade 44 of the rotary tool 36. In the illustrated rotary tool 36 constituted according to the present invention, the hub 42 has an indicator 56 showing the characteristic properties of the cutting blade 44. The indicator 56 in the illustrated embodiment is a tag printed with a bar code indicating the characteristic properties of the cutting blade 44 and the tag is affixed to an appropriate site on the surface of the hub 42. The characteristic properties specified by the bar code, that is, the above thickness T, outer diameter D and projecting length X of the cutting blade 44 can be obtained by measuring the cutting blade 44 accurately or by tentatively cutting the semiconductor wafer W using the rotary tool 36 and then analyzing the cut state of the semiconductor wafer W at the production plant of the rotary tool 36. Thus, the rotary tool 36 can be provided with the indicator 56 before it is shipped from the production plant.

Instead of affixing the tag printed with the bar code, the hub 42 of the rotary tool 36 can be directly printed with a bar code as desired. Alternatively, the hub 42 of the rotary tool 36 may be engraved with a bar code by laser beams.

Figure 5:
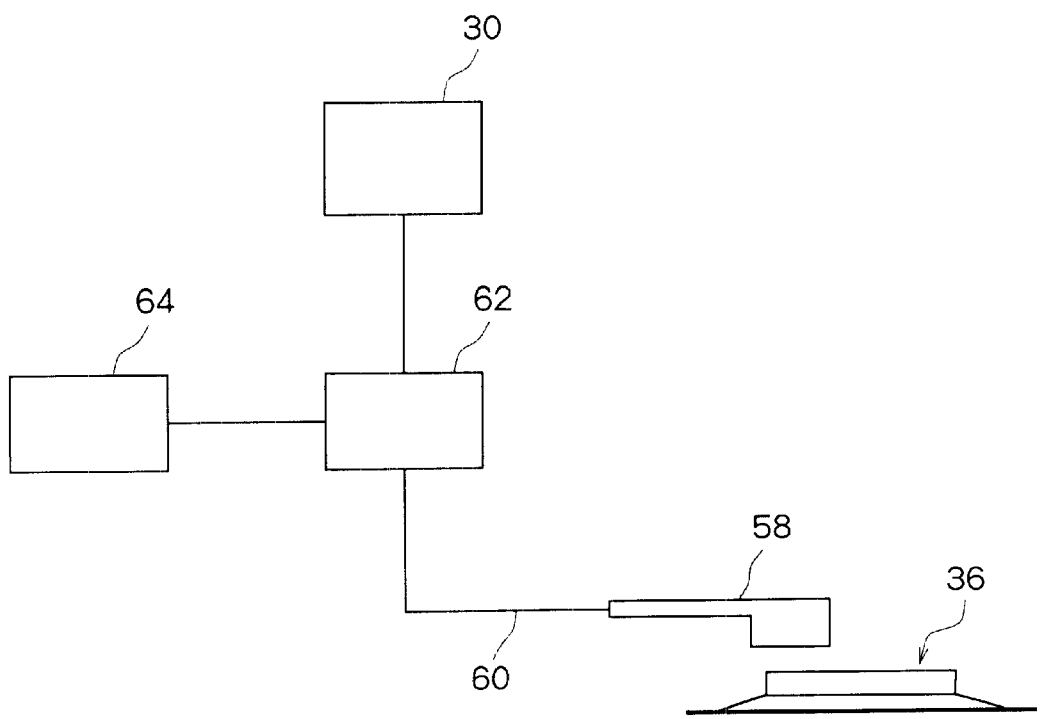
FIG. 5 is a diagram schematically showing control-related elements in the dicer of FIG. 1.

Explaining with reference to FIG. 1 and FIG. 5, the dicer 2 is provided with a reading means 58 composed of a bar code reader. The detachable reading means 58 is installed on the front side of the housing 4 of the dicer 2 and connected to the central processing unit 62 of the control means of the dicer 2 through a line 60. When a new rotary tool 36 is used, the reading means 58 is detached from the housing 4 before the rotary tool 36 is fitted onto the rotary shaft 34, and the indicator 56 on the rotary tool 36 is read by the reading means 58 as shown in FIG. 5. Information read from the indicator 56 by the reading means 58, that is, the characteristic properties of the cutting blade 44 of the rotary shaft 36 are sent to the central processing unit 62 and stored in a storage means 64. They are temporarily displayed on the monitor 30 as required. Therefore, the operator of the dicer 2 can understand the characteristic properties of the cutting blade 44 of the rotary tool 36. When the rotary tool 36 is to be fitted onto the rotary shaft 34 as required to actually cut the semiconductor wafer W, the characteristic properties, especially thickness T and outer diameter D of the cutting blade 44 stored in the storage means 64 are taken into consideration to carry out the positioning of the cutting blade 44 relative to the cutting line L of the semiconductor wafer W. Further, it is possible to warn an operator at a predetermined time that the service life of the cutting blade 44 is coming to an end by comparing the number of times of dicing the semiconductor wafer W, that is, the amount of abrasion of the cutting blade 44 with the above projecting length X of the cutting blade 44. This warning can be given by lighting up a warning lamp (not shown), for example.

Figure 6:
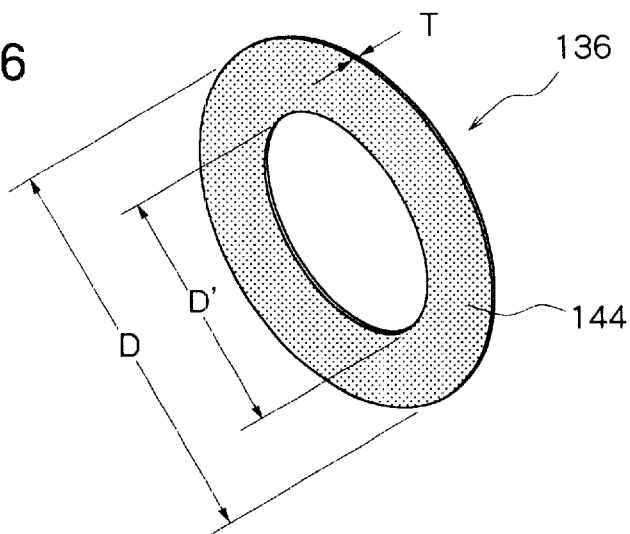
FIG. 6 is a perspective view showing a modification of the rotary tool.

FIG. 6 shows a modification of the rotary tool. This rotary tool 136 shown in FIG. 6 does not include a hub and is composed of only a cutting blade 144 which can be formed from an electrodeposition layer containing abrasive diamond grains. The rotary tool 136 can be advantageously formed by electrodepositing a metal and also accumulating abrasive diamond grains on one side of a metal annular plate and melting the entire annular plate. The rotary tool 136 shown in FIG. 6 can be fitted onto the rotary shaft of a dicer using a hub member (not shown) of an appropriate shape formed separately.

Figure 7:
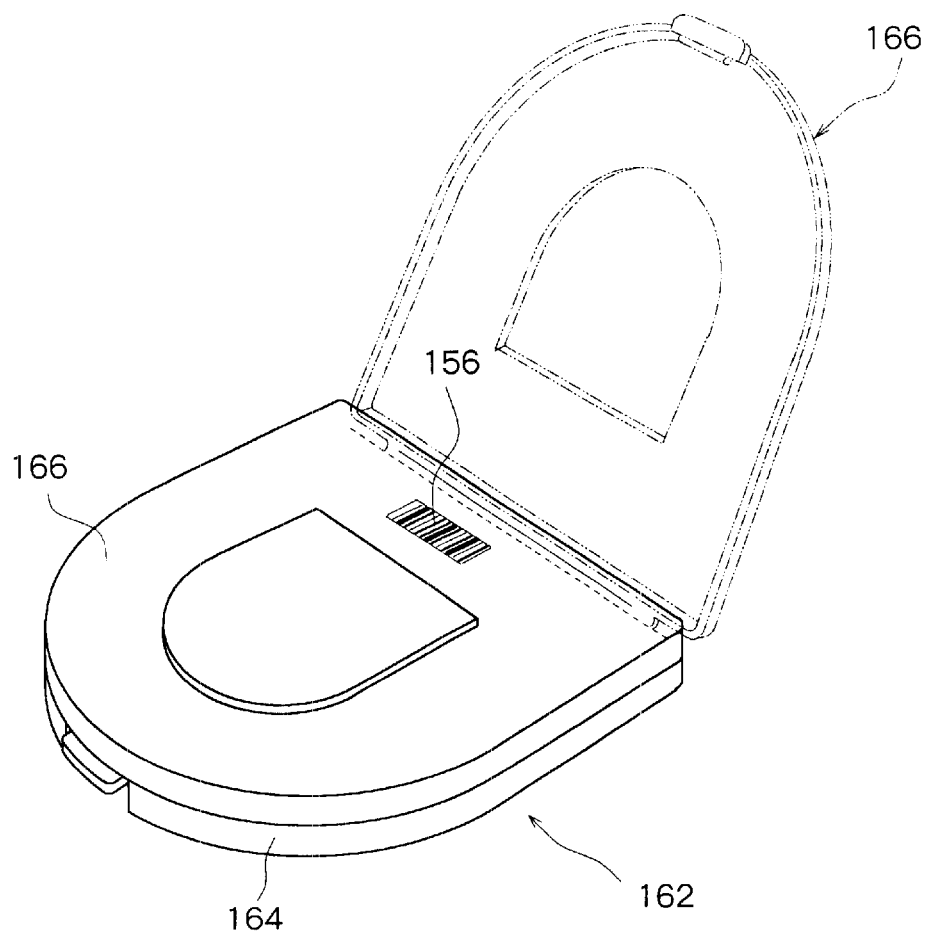
FIG. 7 is a perspective view showing a storing case for storing the rotary tool of FIG. 6.

The rotary tool 136 shown in FIG. 6 is composed of only the cutting blade 144 and does not include a hub. Therefore, when an indicator showing the characteristic properties, that is, thickness T, outer diameter D and inner diameter D' of the cutting blade 144 is to be provided on the rotary tool 136, it must be provided on the cutting blade 144. Meanwhile, as shown in FIG. 7, the rotary tool 136 is put on the market in a state of being stored in a storage case 162 molded out of an appropriate synthetic resin. The storage case 162 which may have a known shape per se has a storage base portion 164 and a cover portion 166 which can be opened and closed, the cover portion 166 can be opened and closed between a close position shown by a solid line and a close position shown by a two-dot chain line. When it is not desirable to provide the indicator 156 on the cutting blade 144, the indicator 156 may be provided at an appropriate site on the outer surface of the storage case 162 as shown in FIG. 7. The indicator 156 can be composed of a tag printed with a bar code.

The rotary tool 36 shown in FIG. 3 and FIG. 4 is also put on the market in a state of being stored in the storage case (not shown). Therefore, in the case of the rotary tool 36 consisting of the hub 42 and the cutting blade 44 which are integrated with each other as shown in FIG. 3 and FIG. 4, the indicator 56 may also be provided on the storage case in place of the rotary tool 36 as desired.

While the preferred embodiments of the invention have been described in detail with reference to the accompanying drawings, it is to be distinctly understood that the invention is not limited thereto but may be otherwise changed or modified without departing from the spirit and scope of the invention.

What is claimed is:

1. A cutting apparatus comprising a rotary shaft which is detachably fitted with a rotary tool including a cutting blade, wherein the rotary tool includes a hub integrated with the cutting blade and an indicator, provided on said hub, showing characteristic properties of the cutting blade, a reading means for reading the indicator is provided, the cutting blade is shaped like a thin annular plate extending from the hub, and the characteristic properties include a thickness of the cutting blade, and a projecting length in a radial direction of the cutting blade from a periphery of the hub.

2. The cutting apparatus of claim 1, wherein the indicator is a bar code and the reading means is a bar code reader.

3. The cutting apparatus of claim 2, wherein the bar code is printed on a tag affixed to the rotary tool.

4. The cutting apparatus of claim 1, wherein the cutting blade is composed of an electrodeposition layer containing abrasive diamond grains and shaped in a form of a thin annular plate.

5. The cutting apparatus of claim 1, wherein the characteristic properties also include an outer diameter of the cutting blade.

6. A method for cutting an object comprising cutting said object with the cutting apparatus as defined in claim 1.

7. A cutting apparatus comprising
a rotary shaft which is detachably fitted with a rotary tool including a cutting blade, and
a storage case, wherein
  the storage case has an indicator showing characteristic properties of the cutting blade and a reading means for reading the indicator is provided,
  the rotary tool is composed of only a cutting blade shaped in a form of a thin annular plate, and
  the characteristic properties include a thickness of the cutting blade, an outer diameter of the cutting blades and an inner diameter of the cutting blade.

8. The cutting apparatus of claim 7, wherein the indicator is a bar code and the reading means is a bar code reader.

9. The cutting apparatus of claim 8, wherein the bar code is printed on a tag affixed to the storage case.

10. The cutting apparatus of claim 7, wherein the cutting blade is composed of an electrodeposition layer containing abrasive diamond grains and shaped in a form of a thin annular plate.

11. A method for cutting an object comprising cutting said object with the cutting apparatus as defined in claim 7.

12. A cutting apparatus comprising
a rotary shaft which is detachably fitted with a rotary tool including a cutting blade, and
a storage case, wherein
  the storage case has an indicator showing characteristic properties of the cutting blade and a reading means for reading the indicator is provided,
  the rotary tool includes a hub integrated with the cutting blade on a surface of the hub,
  the cutting blade is shaped in a form of a thin annular plate extending from the hub, and
  the characteristic properties include a thickness of the cutting blade and a projecting length in a radial direction of the cutting blade from a periphery of the hub.

13. A method for cutting an object comprising cutting said object with the cutting apparatus as defined in claim 12.

* * * * *